UNITED STATES PATENT OFFICE.

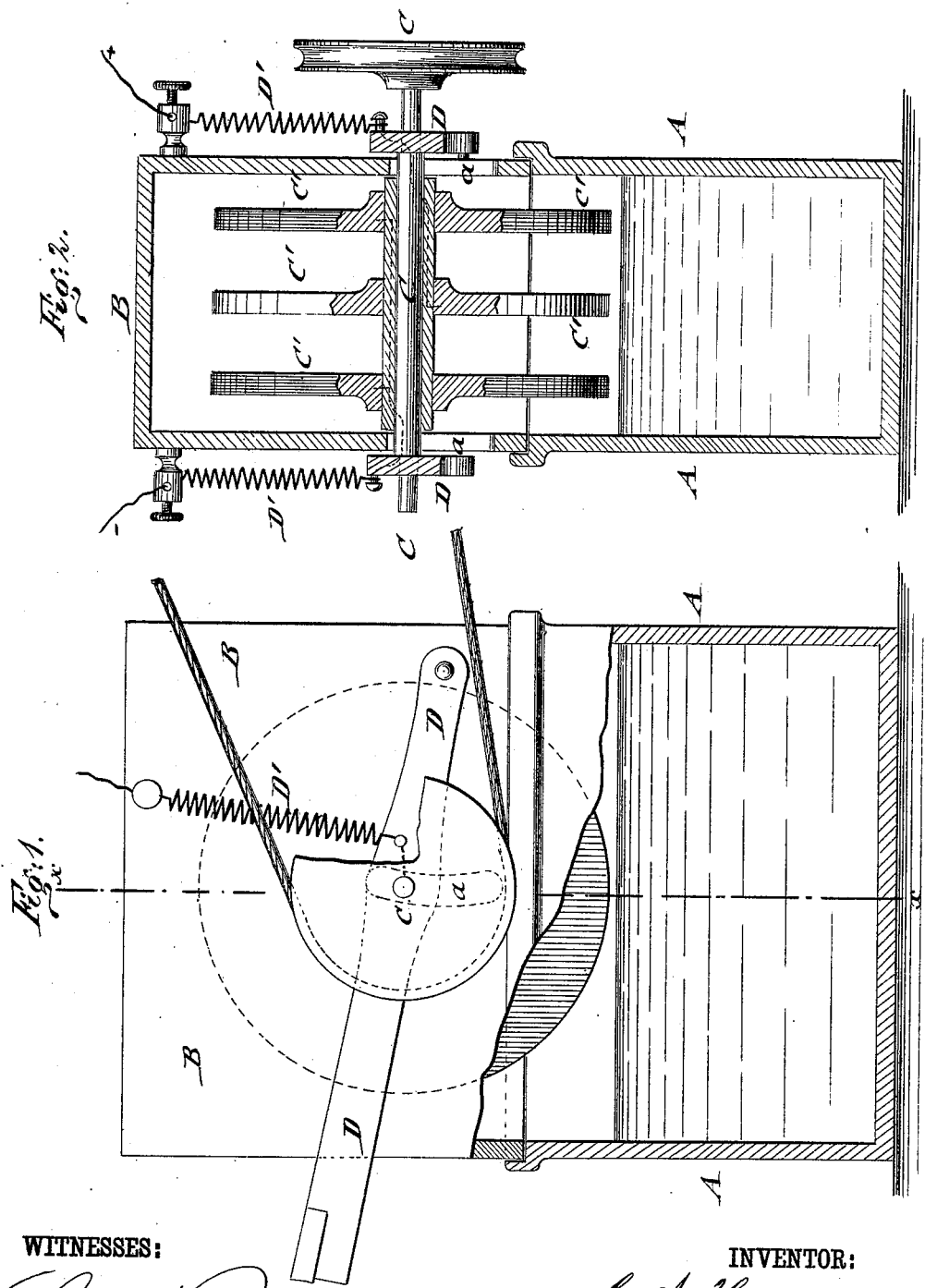

CHARLES A. HUSSEY, OF NEW YORK, N. Y.

IMPROVEMENT IN GALVANIC BATTERIES.

Specification forming part of Letters Patent No. 195,762, dated October 2, 1877; application filed June 18, 1877.

*To all whom it may concern:*

Be it known that I, CHARLES A. HUSSEY, of the city, county, and State of New York, have invented a new and Improved Galvanic Battery, of which the following is a specification:

In the accompanying drawing, Figure 1 represents a side elevation, partly in section, of my improved galvanic battery; and Fig. 2, a vertical transverse section of the same on line $x\ x$, Fig. 1.

Similar letters of reference indicate corresponding parts.

This invention is intended to produce a single-fluid battery of constant strength for running electromotors for light machinery, and all other purposes in which a constant current is required. This battery dispenses with the use of double-fluid batteries for these purposes, and consequently with the use of porous cups and other objectionable features of the same, while providing a cheaper and more constant current than a two-fluid battery. The substitution of a single-fluid battery for the double-fluid battery furnishes a battery that is cheaper to keep up, requires less trouble and care, and which, when not in use, is not liable to deteriorate, as the plates are out of the liquid, the battery being also at any moment ready for use by immersing the plates.

The main objection to the present single-fluid battery consists in the polarization of the plates, which are covered by hydrogen, and thereby rendered incapable of producing a constant current.

My improved single-fluid battery overcomes this objection; and consists of revolving plates or disks which are capable of being immersed into the exciting fluid.

The plates are supported on a shaft that revolves in bearings of a swinging and spring-acted stirrup-frame, which may be lowered by hand or otherwise, and raised on removing the pressure. The plates are connected by insulated wires along the shaft and finally through the spiral springs of the stirrup-frame to the conducting-wires.

In the drawing, A represents a receptacle or cell of suitable size, of which a certain number are arranged together to form a battery, each cell being separated from the adjoining one in suitable manner.

The cells are closed by a protecting top casing, B, in which the shaft C, with any suitable number of elements, C', according to the number of cells A, is arranged.

The shaft C passes out through arc-shaped slots $a$ of the top casing, and is supported in bearings of a stirrup, D, that is pivoted at the rear part to the top casing B, and connected at the front end by a treadle-shaped piece, to be lowered by pressure thereon, either directly by hand or in connection with the treadle of the sewing-machine or other device to be run by the battery.

The stirrup-frame is either hung to or otherwise acted upon by strong spiral springs D', which return the shaft to its uppermost position. The lowering of the shaft immerses the plates, while the raising of the shaft takes them out of the exciting fluid and interrupts the current.

The shaft is revolved slowly by hand, or by belt-and-pulley connection with an electromotor, or otherwise, and the plates immersed into the liquid by lowering the stirrup-frame. The plates are lowered in proportion to the quantity of the current desired.

The elements are made in the shape of disks or otherwise, and mounted upon the shaft, and revolved therewith. As only a part of the plates at the time is immersed into the fluid, which part almost instantly emerges again from the same by the rotating motion imparted, and, as the hydrogen gas collected thereon is lighter than the atmospheric air, the surface-covering of hydrogen is continually dissipated during the revolution of the plates in the air, and the plates kept free from polarization. Thus a current of constant strength is obtained, and a battery provided that may be used with equal efficacy at any moment.

The battery is also very economical, as the material is only spent when in actual use.

The cells are made of greater depth than the radius of the plates, so that the latter may revolve continually at the top of the fluid, and thereby the essential advantage gained that the fluid is effective until entirely saturated.

As the fluid becomes gradually saturated from the bottom of the cell upward, by the specific gravity of the salts being greater than the fluid, consequently the top of the fluid is the last that is saturated, and thus a constant current is obtained until the entire saturation of the exciting liquid has taken place. The battery is thus kept efficient whenever required until complete saturation takes place, which, in connection with the constant current obtained by the mechanical prevention of the polarization of the plates, forms a battery that is better adapted for practical applications than those heretofore employed.

Having thus described my invention, I claim as new and desire to secure by Letters Patent—

1. The combination of the revolving plate-carrying shaft with a swinging and spring-acted stirrup-frame, for lowering plates into fluid or raising them out of the same, substantially as described.

2. The combination of the cell A, covering-casing B having arc-shaped slots $a$, revolving shaft C having plates C', and pivoted and spring-acted stirrup-frame D D', substantially as and for the purpose described.

CHARLES A. HUSSEY.

Witnesses:
PAUL GOEPEL,
C. SEDGWICK.